United States Patent [19]
Lohr

[11] 3,818,977
[45] June 25, 1974

[54] THAWING FROZEN FOOD
[75] Inventor: Alfred Lohr, Bochum, Germany
[73] Assignee: F. Kuppersbusch & Sohme Aktiengesellschaft, Gelsenkirchen, Germany
[22] Filed: Mar. 30, 1972
[21] Appl. No.: 239,599

[30] Foreign Application Priority Data
Mar. 30, 1971 Germany.............................. 2115340

[52] U.S. Cl.......................... 165/2, 165/30, 165/61, 165/84, 165/120
[51] Int. Cl........................................... F25b 13/00
[58] Field of Search.............. 165/2, 30, 61, 84, 120

[56] References Cited
UNITED STATES PATENTS
3,682,643   8/1972   Foster.................................. 165/30

Primary Examiner—Charles Sukalo
Attorney, Agent, or Firm—Spencer & Kaye

[57] ABSTRACT

A method and apparatus for thawing blocks of frozen food by vibrating them on a grate within a thawing chamber while they are thawed by circulating hot air. The vibrations cause pieces to be ejected from a block after the required amount of heat has been supplied to melt these pieces. The ejected pieces are received in a collecting vessel which is maintained at a predetermined temperature to bring these pieces to serving temperature.

1 Claim, 1 Drawing Figure

PATENTED JUN 25 1974　　　　　　　　　　　　　　3,818,977
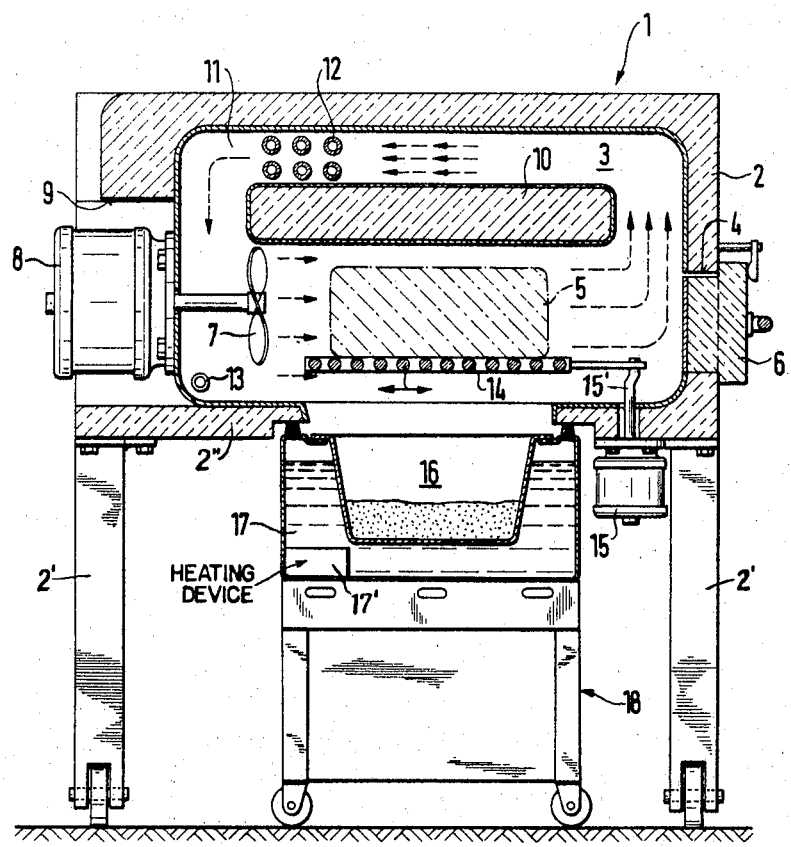

12

THAWING FROZEN FOOD

BACKGROUND OF THE INVENTION

The present invention relates to a method and apparatus for thawing food, particularly frozen food in the form of blocks, in an externally accessible thawing chamber where the blocks are thawed by means of circulating hot air.

It is well known to thaw frozen food or finished dinners and heat them for consumption in their packaging, or in special containers, by means of thawing devices. The frozen food is thawed in devices which operate either with convection or radiation heat or by means of circulating hot air. However in such known devices the thawing temperature must be limited to the vicinity of about 100° C so as to prevent drying or burning of the food in its edge regions. This results in the drawback that because of this temperature limitation, the thawing times for large portions, particularly for frozen foods in the form of blocks, i.e., frozen fish or vegetables, is relatively long. This is undesirable not only from the standpoint of the long wait before the food can be served, but also because long thawing and heating times lead to a substantial impairment in their taste and digestibility as well as to a reduction in the nutritive value of these foods.

SUMMARY OF THE INVENTION

Therefore it is the object of the present invention to enable frozen, and preferably unpackaged, foods in the form of blocks to be carefully thawed in the shortest time and heated to serving temperature without burning or drying out of the food.

In general, the objects according to the present invention are accomplished by introducing one or more blocks of food into a stream of air at a controlled high temperature within a thawing chamber and to there continuously vibrate them on a vibration producing device operating at an optimum frequency. Pieces from these blocks of food are then ejected, after the required amount of heat for melting these pieces has been supplied, due to the vibrations and are brought to a collecting vessel, maintained at controlled temperature, where they are brought to the consumption, or serving, temperature.

One of the advantages of the present invention is that the removal of the thawed food portions from the block considerably accelerates thawing of the entire block. Further the subsequent collection of the thawed portions in a collecting vessel, under controlled temperature, effects careful heating of the thawed food to the consumption temperature. As a consequence burning and drying of the accumulated food is avoided.

BRIEF DESCRIPTION OF THE DRAWING

The single FIGURE of the drawing is an elevational cross-sectional view of one preferred embodiment of a thawing apparatus according to the invention.

DESCRIPTION OF THE PREFERRED EMBODIMENT

The apparatus utilized for thawing frozen foods, according to the invention, indicated generally at 1, is composed of a box-shaped, insulated housing 2, supported on legs 2', and a thawing chamber 3 disposed within the housing. The thawing chamber 3 has an inlet opening 4 through which a block of frozen food 5 can be inserted in the chamber to be thawed. The inlet opening 4 can be closed off by a cover 6.

An air circulating blower or fan 7 is disposed in thawing chamber 3 and its motor 8 is accommodated in a recess 9 in the wall of the box-shaped housing 2. Approximately in the center of the thawing chamber 3 a horizontally extending partition wall 10 is so disposed that a continuous air channel 11 is formed. In the air channel 11 and above the partition wall portion 10 a heat exchanger 12, which can be of well known design, is disposed. As seen in the FIGURE the heat exchanger consists of a plurality of pipes through which a heating medium passes and around which passes the circulating air stream in channel 11, the movement of which is shown by arrows.

A thermostat 13 for controlling the operation of the heat exchanger so as to regulate the temperature in the thawing chamber 3 is also disposed therein. As thermostats are well known, it is not described here but it will be understood that it is operatively connected to the heat exchanger.

In the thawing chamber 3 a vibratory grate 14 is suitably mounted to receive the frozen food 5, which is to be thawed in the apparatus, and this grate can be moved back and forth as indicated by the double-headed arrow. A vibration producing device 15, e.g., a motor, operatively connected to the vibratory grate 14, by a crank arm 15', serves to impart vibratory movement to the grate.

Below the vibratory grate 14 and an aligned opening in the lower wall 2" of housing 2, a temperature-controlled collecting vessel 16 is disposed to receive the pieces of the frozen food block which drop off the block due to the shaking of the vibratory grate 14. The collecting vessel 16 is carried in a water bath 17 which is kept at approximately 100° C by a suitable thermostatically controlled heating device 17' and which is accommodated in a food discharge cart indicated generally at 18, which is movable so that it can be positioned below the thawing chamber 3 of thawing device 1, and subsequently rolled away from the thawing apparatus.

The stream of air which is blown by the circulating air blower 7 through the air channel 11 of the thawing chamber, through the heat exchanger 12 and over the food to be thawed is heated by heat exchanger 12 to a very high temperature which lies approximately between 100° and 300° C so that rapid melting of the block 5 is achieved. Because the block of frozen food 5 is continuously kept in motion during the thawing process by the vibrator 15, operating at optimum frequency via vibratory grate 14, the thawed portions are continuously broken away from the frozen food 5, after the required amount of heat for melting these portions has been supplied, and these portions fall into a collecting vessel 16.

The water bath 17, which surrounds the collection vessel 16 and which is kept at a temperature of approximately 100° C, heats the food portions in the collecting vessel and brings them to serving, or consumption, temperature. Since the collecting vessel 16 is carried on a movable food discharge carriage 18, the heated food can be brought to its serving location without the necessity of transferring it to different containers.

The apparatus according to the present invention is particularly suited for large-scale food-dispensing operations in which part of the food to be served is furnished in frozen blocks ready for the kitchen. The thawing process according to the present invention preserves substantially all of the nutritional value of the vitamins in the frozen foods.

It will be understood that the above description of the present invention is susceptible to various modifications, changes and adaptations, and the same are intended to be comprehended within the meaning and range of equivalents of the appended claims.

I claim:

1. A method for thawing blocks of frozen food in an externally accessible thawing chamber in which the blocks are thawed by means of circulating hot air, comprising the steps of:

a. placing a block of frozen food on a vibration producing device disposed within the thawing chamber;

b. causing a stream of hot air at a controlled high temperature to flow past the block;

c. operating the vibration producing device at an optimum frequency to keep the block of frozen food continuously moving on the device, for causing pieces of the block of frozen food to separate from the block after the required amount of heat for melting these pieces has been supplied;

d. collecting the separated pieces in a vessel which is associated with the thawing chamber; and e. maintaining the vessel at a controlled temperature to bring the pieces therein to consumption temperature.

* * * * *